Fig. 2

May 8, 1934.    A. C. PATTERSON    1,958,393
APPARATUS FOR REFORMING CAN BODIES
Filed Sept. 27, 1930    5 Sheets-Sheet 4

INVENTOR
Arthur C. Patterson
BY
John C. Carpenter
ATTORNEY

Patented May 8, 1934

1,958,393

UNITED STATES PATENT OFFICE 1,958,393

APPARATUS FOR REFORMING CAN BODIES

Arthur C. Patterson, Portland, Oreg., assignor to American Can Company, New York, N. Y., a corporation of New Jersey Application September 27, 1930, Serial No. 484,833

19 Claims. (Cl. 153—32)

The present invention relates to an apparatus for reforming can bodies from a flattened form, given them to permit economical storage and shipment, into a round or other final form required in commercial packages. The present invention does not concern itself with the production of the flattened bodies and relates only to the conversion from the flattened shipping condition into final shape.

The principal object of the present invention is the provision of an apparatus for rapidly reforming flattened can bodies in successive steps whereby the body is opened from its flattened shape and its walls ironed out or smoothed and the bodies thereby brought to the desired can body shape.

An important object of the invention is the provision of an apparatus for automatically feeding flattened can bodies from a magazine and positioning them alternately over one of two mandrels for a reforming operation, one body being reformed while a subsequent body is being positioned ready for reforming.

The invention contemplates the use of improved spreading fingers for initially opening a flattened can body prior to its being brought to can body shape.

Numerous other objects of the invention will be apparent as it is better understood from the following description, which, taken in connection with the accompanying drawings, discloses a preferred embodiment thereof.

Referring to the drawings.

The apparatus illustrated in the drawings discloses a preferred embodiment of the invention in which flattened can bodies are held in stacked formation within a magazine. A reciprocating feeding device withdraws and feeds an individual body into position between and in axial alignment with a pair of stationary mandrels. Each mandrel is provided with spreading fingers pivoted to its front or inner end and a reciprocating shuttle slide transfers the positioned flattened body to one or the other of the mandrels by moving it over the spreading fingers associated with that mandrel.

During the passage of a body on to a mandrel, the small opposed circular edges joining the flat walls of the flattened body, move over the extended spreading fingers which initially separate these body walls. The fingers collapse after the body is fully engaged and allow free passage of it on to the mandrel. Reforming dies carried on opposed reciprocating slides then clamp the positioned body against the side edges of the mandrel ironing out the creases in the body in and adjacent to such opposed circular edges while moulds confine and smooth the other parts of the body, thus bringing the walls of the body to desired can body shape.

While this reforming operation is taking place on one of the mandrels, a second can body is being fed to the shuttle slide. A subsequent shifting movement of the shuttle positions the second body upon the second mandrel and discharges the reformed body from the first mandrel.

Figure 1:
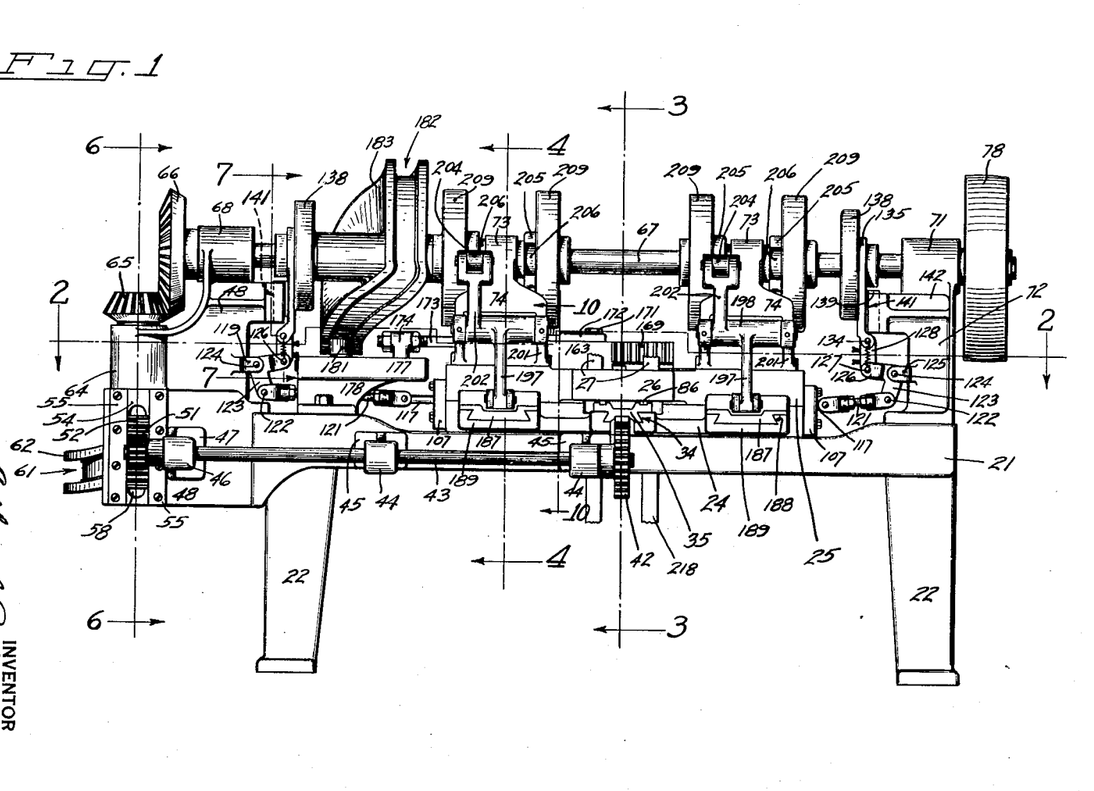
Figure 1 is a front elevation of the apparatus.
Figure 2:
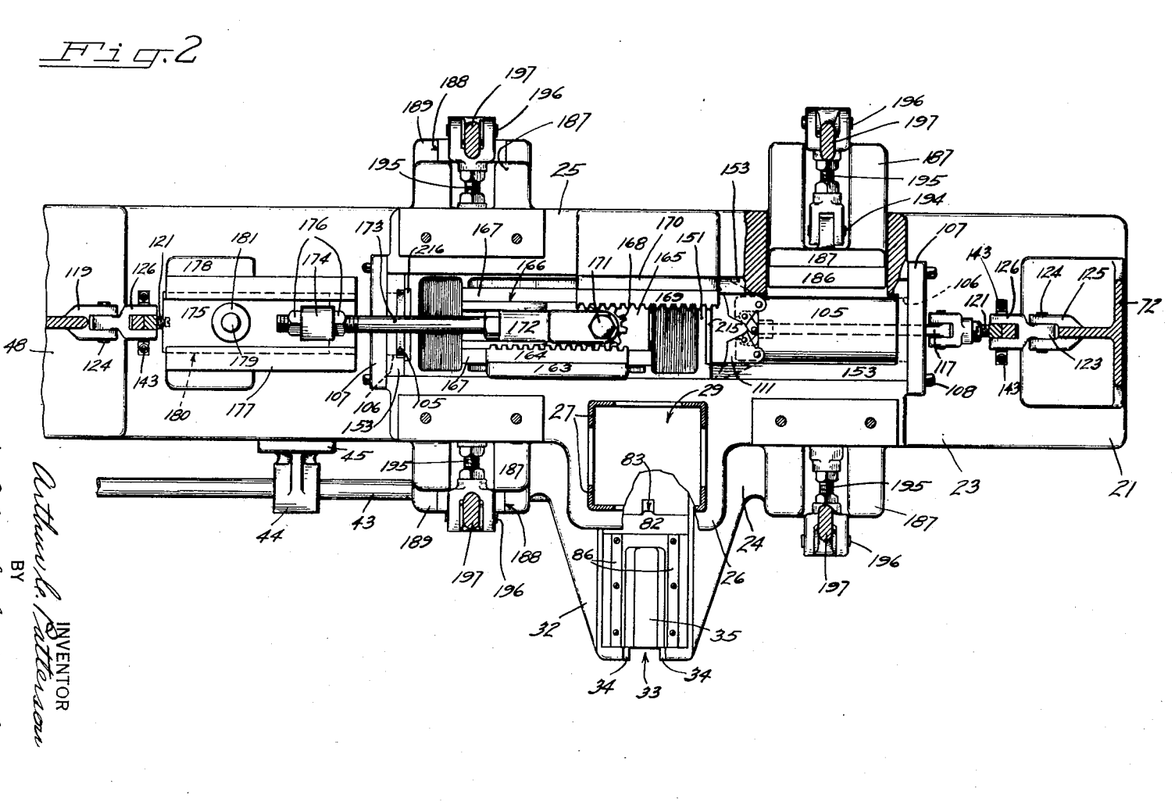
Fig. 2 is a sectional plan view of the apparatus taken substantially along the line 2—2 in Fig. 1.
Figures 4, 5:
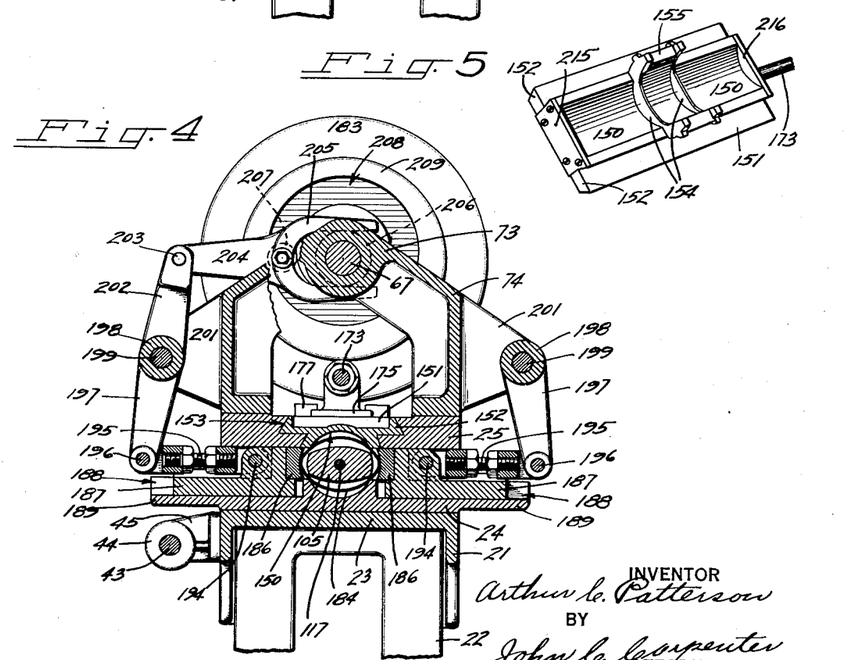
Fig. 4 is an enlarged sectional view taken substantially along the line 4—4 in Fig. 1.
Fig. 5 is a perspective detail of the body feed shuttle slide, as viewed from the under side.

The parts of the machine of the present invention are supported on a bed 21 (Figs. 1 and 2) carried by legs 22, the upper surface of the bed forming a table 23 (see also Figs. 2 and 4). A slide frame 24 is mounted centrally of the table 23 and supports a cover frame 25 resting upon and secured thereto.

The frame 25 (Fig. 2) is projected along the front side of the table at 26 and forms a support for vertical angle irons 27 comprising a part of a can body magazine which is adapted to contain flattened can bodies 28 in super-imposed or stacked formation. An aperture 29 (see also Fig. 3) is cut through the frame 25 and registers with a similar opening 31 formed in the frame 24 directly beneath the stack of bodies 28. These openings are utilized as passageways for the discharge of the flattened bodies individually from the stack.

The frame 24 is also projected along the front side of the table at 32 (Figs. 2 and 3) and is centrally slotted at 33 to provide slideways 34, in which operates a body slide member 35, having reciprocating movement beneath the stack of bodies in the magazine. The slideways 34 are undercut, as illustrated in Fig. 1, to retain the slide in working position and to prevent displacement thereof.

The under side of the slide member 35 (Figs. 1 and 3) is formed with rack teeth 41 which mesh with a gear 42 secured to a horizontal shaft 43 journaled in bearings 44 (see also Fig. 2) formed in brackets 45 secured to the front wall of the bed 21 and in a bearing 46 formed in a bracket 47 secured to a frame 48 mounted on one end of the bed 21.

Figure 6:
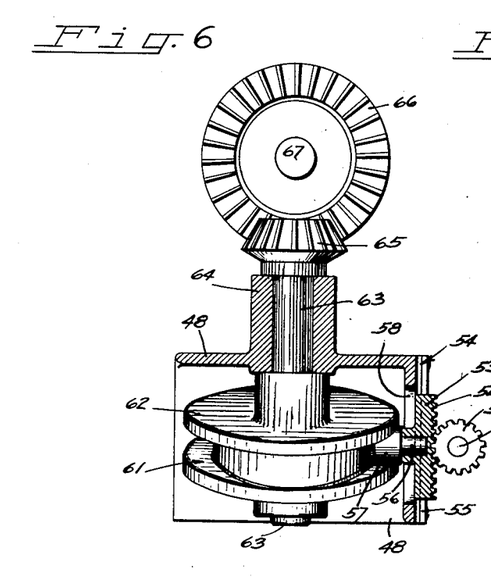
Fig. 6 is an enlarged transverse sectional view taken substantially along the line 6—6 in Fig. 1.

The shaft 43 (Figs. 1 and 6) carries a gear 51 which meshes with rack teeth 52 formed in a sliding member 53 having vertical movement within a slideway 54 formed, in the side wall of the frame 48, by guide plates 55 bolted to the frame 48. The slide 53 carries a horizontal pin 56 and a cam roller 57 rotatably mounted thereon, which extends through and has movement within an opening 58 formed in the wall of the frame adjacent the guide plates 55. The cam roller 57 operates within a cam groove 61 of a peripheral cam 62 mounted on a vertical shaft 63 carried in a bearing 64 formed in the frame 48.

The shaft 63 also carries a bevel gear 65 which meshes with a similar gear 66 carried on a horizontal drive shaft 67 journaled in a bearing 68 carried by the frame 48 and at the opposite end of the machine in a bearing 71 formed in a bracket 72 mounted on the bed 21. The shaft 67 is also journaled in intermediate bearings 73 (Figs. 1 and 4) carried by housings 74 mounted on the cover frame 25. The shaft 67 carries a drive pulley 78, to which power is supplied for rotation thereof, in any suitable manner.

Rotation of the drive shaft 67 through the described gearing rotates the shaft 63 and its cam 62, causing the slide member 53 to raise and lower in accordance with the contour of the cam groove 61. This oscillates the shaft 43 which movement is transmitted through the rack and gear elements 41 and 42 to move the slide 35 beneath the can body magazine.

Figure 3:
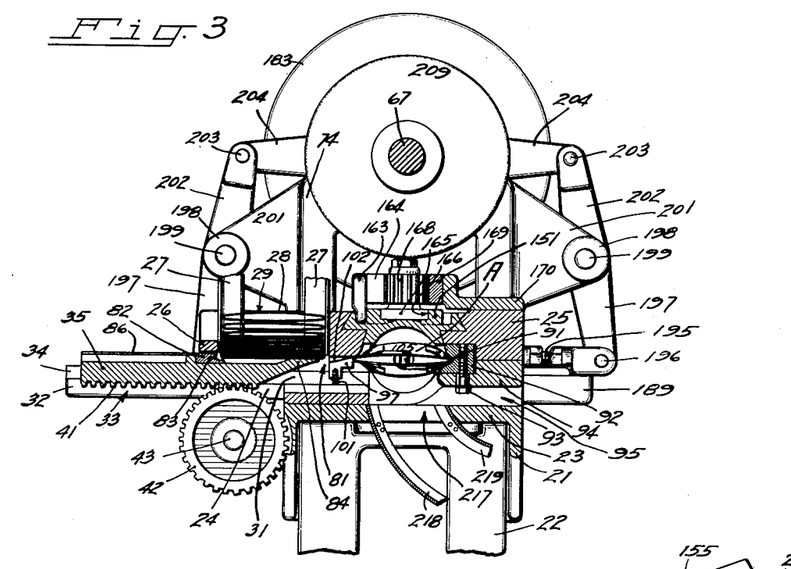
Fig. 3 is an enlarged transverse sectional view taken substantially along the line 3—3 in Fig. 1.

The cover frame 25, (Fig. 3) is slotted at 81 inwardly from the inner vertical members 27 to coincide with the inner end of the slot 33, these two slots permitting passage of the slide 35 beneath the frame 25. The slide carries a block 82 which extends transversely thereof and is formed with a notched shoulder 83 which is just outside of the line of bodies 28 in the magazine when the slide is in retracted position, as illustrated in Fig. 3. One side of the stack of bodies 28, at such time, rests on the shouldered block 82, while the opposite side of the stack rests upon a forward end 84 of the slide.

As the slide 35 moves toward the right, the lowermost body is engaged by the notched shoulder 83 of the block 82 and is slid horizontally from beneath the stack of bodies in the magazine, this body moving through the slot 81. The pair of angle members 27 which are adjacent the frame 25 prevent passing of the remaining super-imposed bodies from the magazine, the remaining stack, during this forward movement of the slide, resting upon spaced strips 86 (Figs. 1, 2 and 3) mounted on the upper surface of the slide.

The flattened can body is brought to rest at the position designated by the letter A (Figs. 3 and 12), its forward edge having moved into a groove 91 of a block 92 fastened by bolts 93 to a plate 94 which is secured to the under surface of the cover member 25, the slide frame 24 being slotted at 95 to accommodate this construction. This grooved block 92 forms the support for the forward edge of the body when in such position.

A pair of blocks 97, each provided with a projection 98, have vertical movement within slots 99 formed in the slide frame 24 on opposite sides of the slot 81. Each block 97 is yieldingly supported on a spring 101 which rests upon the frame 24 and the upper surface of the block is beveled at 102 to permit passage of the can body from the magazine into the position A. The forward edge of the advancing can body, during such passage, engages the beveled surfaces of the blocks 97 and, wedging itself between the lower face of the cover frame 25 and the blocks, forces the latter downwardly against the action of their springs. These blocks, under the action of their springs, support the rear edge of the body as it rests in its position A.

Figure 11:
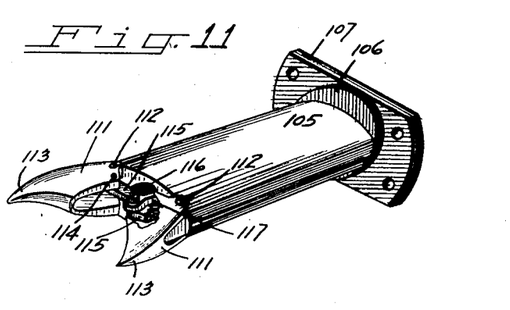
Fig. 11 is a perspective view of one of the forming mandrels, illustrating the spreading fingers associated therewith.

The positioned can body is in axial alignment with and between a pair of mandrels 105, each mandrel being secured to a boss 106 formed as an integral part of a plate 107 (Figs. 1, 2 and 11). Bolts 108, passing through the plates 107, threadedly secure the mandrels in fixed position on opposite ends of the frames 24 and 25.

Figure 12:
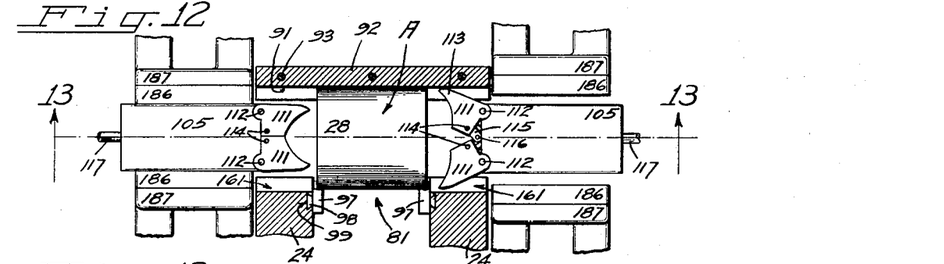
Fig. 12 is a schematic fragmentary plan detail of the two forming mandrels and reforming dies associated therewith, the view illustrating a flattened can body prior to transfer to a mandrel.

A pair of spreading fingers 111 (Figs. 11 and 12) are movably mounted on pivots 112 carried on the forward inner ends of each of the mandrels 105, these fingers being provided with pointed extremities 113. Each finger 111 of each pair of fingers is also pivotally connected at 114 to a link 115, in turn pivotally connected at 116 to the inner end of a rod 117, extending longitudinally through each mandrel 105 and having movement relative thereto. Sliding movement of each rod 117 causes its pair of fingers 111 to collapse into closed position, as illustrated in Fig. 12 by the left-hand pair of fingers, or to spread into open position, as illustrated by the right-hand pair of fingers.

The outer extremity of each rod 117 is pivotally connected to an adjustable link 121 (Figs. 1 and 2) which is also pivotally connected at 122 to one arm of a bell-crank lever 123 having oscillation on a pin 124. The pin 124 of one of the bellcrank levers, on one side of the machine, is carried in spaced lugs 125 projecting from the bracket 72 and the other pin 124, for the bellcrank lever on the opposite side of the machine, in spaced lugs 119 projecting from the frame 48.

Figure 7:
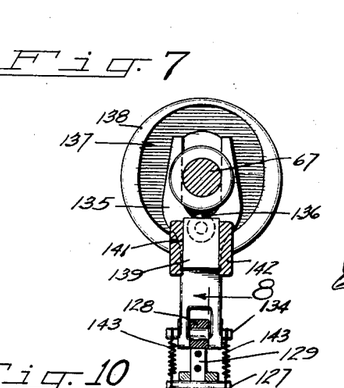
Fig. 7 is an enlarged transverse sectional detail taken substantially along the line 7—7 in Fig. 1.
Figure 8:
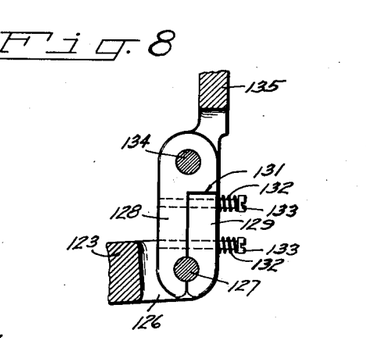
Fig. 8 is an enlarged detail section of the lower part of the mechanism illustrated in Fig. 7, as viewed substantially along the line 8—8 in that figure.

The opposite arm of each bellcrank lever 123 (see also Figs. 7 and 8) is provided with a slotted end 126 in which is carried a horizontal pin 127 extending across the slot and forming one element in a safety clutch device. A split link is provided as a feature of such a safety device, this link consisting of a body member 128 and a movable side plate 129, the latter fitting in a slot 131 formed in the body member and normally tightly held in position by springs 132 surrounding bolts 133, which pass through the plate 129, and are threadedly secured to the member 128. The link members 128 and 129 of each clutch device are mutually grooved to engage the pin 127 associated therewith and to normally form a pivotal connection between it and a second pin 134 carried on the lower end of a cam yoke 135. The upper forked end of the yoke has sliding movement on the shaft 67 and carries a cam roller 136 which operates within a groove 137 of a face cam 138 secured to the shaft 67.

The rear face of each yoke 135 (Figs. 1 and 7) is extended into a block section 139 which slides within a slot 141 formed in an extension 142 of the bracket 72, this construction insuring accurate sliding movement of the yoke. The two pins 127 and 134 project beyond the side walls of the members 123 and 135 and are connected on both sides by springs 143.

The springs 132 and the springs 143 thus cooperate to provide a connection between each sliding yoke 135 and its associated bellcrank lever 123 but in the event of an obstruction to the free movement of the rods 117, such as would result from jamming of the spreading fingers 111 in a can body, the holding actions of the springs of such safety device are overcome and the pin 127 thereof snaps out of its seat in the link members 128 and 129. The full sliding movement of the cam yoke 135 thereupon takes place without imparting a similar movement to its bellcrank lever 123.

The flattened can body 28 is moved laterally from its position A over one or the other of the mandrels 105 passing, at such time, over the spreading fingers 111 associated therewith. Alternate can bodies move toward the right (Fig. 12), while the intervening bodies move toward the left. As one can body reaches its position on the right-hand mandrel, for example, the next succeeding can body moves into position A, to be later slid laterally over the left-hand mandrel. This action will be better understood as the description proceeds.

A body feed shuttle member is used to transfer the flattened can bodies from the position A onto the mandrels 105, this shuttle member comprising a shuttle slide 151 (Figs. 3, 4, 5, 10 and 13), having laterally extending ledges 152 which move in guideways 153 formed in the cover frame 25. The ledges 152 are beveled along their edges to insure proper holding of the slide during its movement. Spaced plates 154 (Fig. 5) extend from the under surface of the slide and are connected by a web 155, these plates providing engaging walls for the can body. The central under-surface of the slide is cupped in cylindrical form to provide pockets 150 for the can bodies after they have been brought to desired form, the walls of these pockets acting as confining and smoothing surfaces, as will be hereinafter described.

Figure 13:
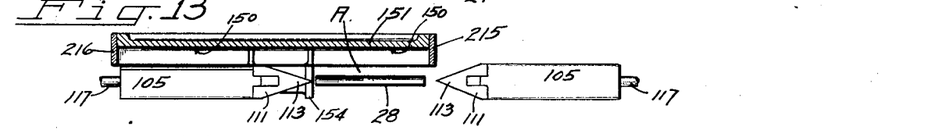
Fig. 13 is a schematic fragmentary detail, partly in section, of the parts as viewed substantially along the line 13—13 in Fig. 12.

As the first flattened can body 28 comes into the position A, as illustrated in Fig. 13, the slide 151 is toward the left and the plates 154 are adjacent the left-hand end of the body. At this time the spreading fingers 111, on the right-hand mandrel 105 (see also Fig. 12), are in their open position with their extremities 113 in alignment with the small circular opposite edges of the flattened body. These edges, on a body at position A, are always in exact position being held in the groove 91 and in the blocks 97. The intermediate section of the flattened body between its edges may be bent up or down but this does not alter the location of its edges which are used as reference points for feeding on the spreading fingers.

Figure 14:
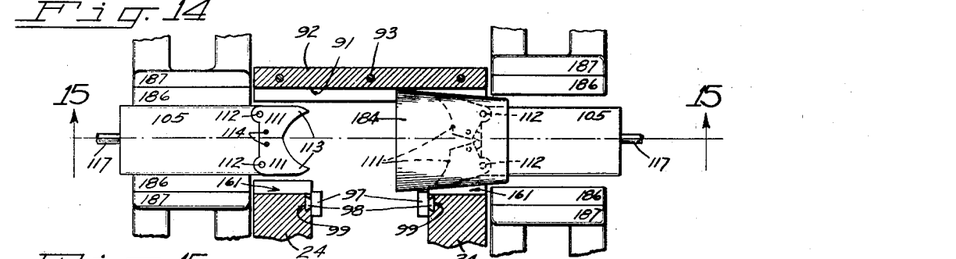
Fig. 14 is a view similar to Fig. 12, illustrating a flattened can body being introduced on one of the mandrels.
Figures 15, 16:
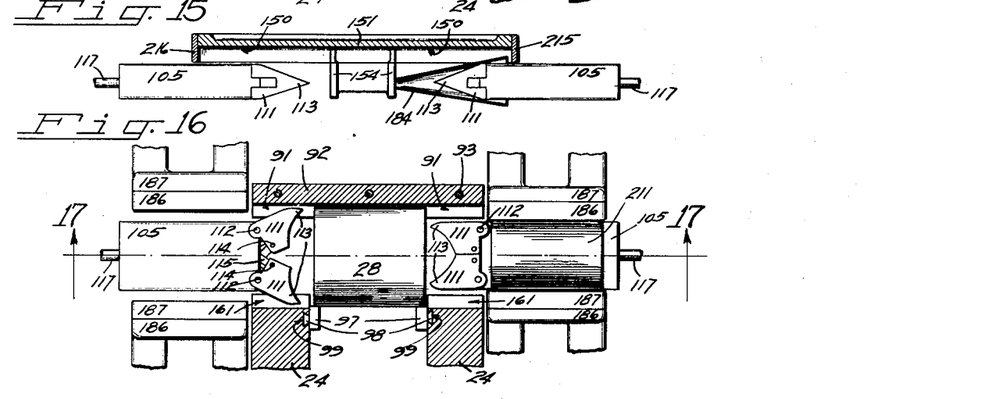
Fig. 15 is a view similar to Fig. 13 but with the parts positioned as in Fig. 14, the section being taken substantially along the line 15—15 of the latter figure.
Fig. 16 is a view similar to Fig. 12, illustrating a different position of the operating parts.

The movements of the body under consideration, from its position A on to the right-hand mandrel, is disclosed in three step positions, illustrated respectively in Figs. 12, 14 and 16. Fig. 12 illustrates the body prior to engagement with the spreading fingers 111; Fig. 14 shows the body fully engaged on the fingers and just entering upon the mandrel 105; Fig. 16 illustrates the body fully in position and on the mandrel. The spreading fingers 111 collapse or close after engaging within the body and a partial opening of the body takes place as it passes from the position illustrated in Fig. 14 into that shown in Fig. 16.

The rear edge of the body during this movement, leaves the blocks 97 and passes along a slot 161 (Figs. 10 and 12) formed in the cover frame 25 and in the frame 24, the opposite or forward edge of the body continuing in the groove 91 which extends right and left to positions adjacent the forward ends of the mandrels 105.

The shuttle slide 151 is positively reciprocated by a double rack and pinion device illustrated in Figs. 2 and 3, a part of the slide being extended upwardly along its forward edge at 163 and this projection being formed into a rack 164. A sliding block 165 is mounted on the slide 151 and has longitudinal movement in a slot 166 formed in the upper surface of the slide. The rack 164 is engaged by a pinion 168 loosely mounted on a bolt 171 which is threaded to and carried by the sliding block 165. This pinion also engages a second rack 169 held in a stationary position on a bracket 170 mounted on the cover frame 25.

This combination of the pinion, the moving rack 164 and the stationary rack 169 effects a travel for the movable rack, with its slide 151, which is double the travel of the pinion 168 and its block 165. The driving force for the unit is applied through the sliding block 165.

The block 165 is projected rearwardly at 172 and this projection is threadedly secured to a connecting rod 173. The opposite end of the rod 173 is threadedly secured to a boss 174 of a slide 175, locknuts 176 being disposed on opposite sides of the boss and threadedly secured to the rod, thus providing adjusting means for changing the relative positions of the slide members 165 and 175.

The slide 175 (Figs. 1 and 2) has longitudinal movement in guideways 180 formed in spaced lateral extensions 177 of a bracket 178 bolted to the table 23. The slide 175 carries a vertically extending stud 179 on which is loosely mounted a cam roller 181 operating in a groove 182 formed in a barrel cam 183 secured to the shaft 67. Operation of the cam moves the slide 175 and the sliding block 165 back and forth and the pinion 168 is bodily moved back and forth along the stationary rack 169 and, at the same time, is caused to rotate on its bolt 171. This rotation, by reason of its geared connection with the rack 164, effects a movement of the shuttle back and forth at an increased rate of travel or, in other words, the shuttle moves twice as far as the sliding block 165.

Each mandrel 105 cooperates with its spreading fingers 111, as previously described, to partially open the flattened body as it moves thereover. When the body is fully seated in position on its mandrel, it assumes the shape illustrated in Fig. 4 and designated by the numeral 184. The body is still far from being cylindrical although its small opposed circular edges are partially spread, and these edges are engaged by reforming die units cooperating with the side walls of the mandrel to complete the reforming operation.

A pair of reforming die units are associated with each mandrel and comprise die blocks 186 (Figs. 4 and 9) inserted in the forward ends of opposed slides 187. Each slide 187 has sliding movement in a horizontal guideway 188 (Figs. 1, 2 and 4) formed in the slide frame 24, the frame being extended at 189 to provide sufficient support for the slide when in outer position. The side walls of each guideway 188 are undercut to fit a formed tongue section of the slide and to permit its movement while preventing its displacement. Each slide 187 is pivotally connected at 194 to one end of an adjustable link 195 also pivotally connected at 196 to the lower end of an arm 197. Each arm 197 is an integral part of a sleeve 198 which oscillates on a stationary shaft 199 held in spaced lugs 201 projected from the side of the housing 74.

Each sleeve 198 is also formed with an upwardly extending arm 202 which is pivotally connected at 203 to the outer end of a cam yoke 204 having a forked end 205 engaging over a collar 206 carried by the shaft 67. Each yoke 204 carries a cam roller 207 which engages a cam groove 208 formed in one face of a cam 209 secured to the shaft 67. It will be understood that there are two slides 187 opposed to each other and located on opposite sides of each mandrel 105, there being an arm 197 associated with each slide. There are, therefore, four sleeves 198 for the two mandrels 105 and a corresponding number of cams 209. Each slide 187, therefore, has independent control by reason of its individual cam but the cams are so formed as to cause simultaneous approach and retraction of a pair of slides relative to their associated mandrel 105.

With the partially formed body 184 on its mandrel 105, the slides 187 associated therewith move inwardly and clamp the opposite sides of the body tightly against the opposed faces of the mandrel, the inner faces of the die blocks 186 being properly shaped for this purpose. This action forces the intermediate wall parts outwardly, above and below, the engaged wall parts as they are being squeezed against the mandrel.

That intermediate part of the wall of the flattened body above and between the clamped wall parts is brought into true cylindrical shape by being forced against the concaved wall of the pocket 150 (Figs. 3 and 4) while the lower intermediate wall part is shaped into cylindrical form by the concaved wall of a similar pocket 200 formed on the central section of the slide frame 24 positioned directly beneath.

These two pockets thus form moulds for the can body and prevent the development of angular and irregular surfaces as the can body is being brought to true cylindrical shape. The cylindrical walls of the pockets 150 and 200 coincide exactly with the curved faces of the die blocks 186 and there is, therefore, no change of curve in the restored body wall.

Figure 9:
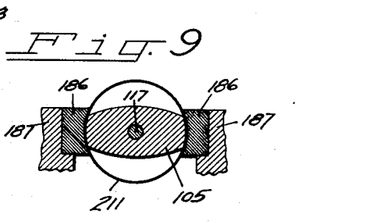
Fig. 9 is an enlarged view of a part of the mandrel and reforming die illustrated in Fig. 4 but with these parts in a different position.
Figure 10:
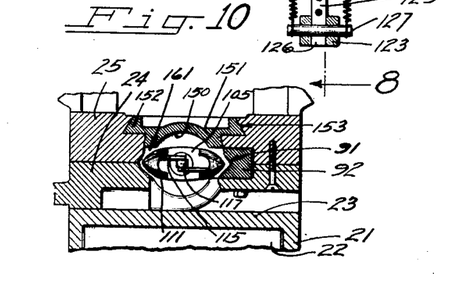
Fig. 10 is an enlarged transverse sectional view taken substantially along the line 10—10 in Fig. 1.
Figure 17:
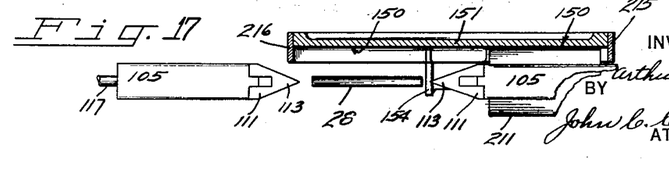
Fig. 17 is a view similar to Fig. 13 but with the parts positioned as in Fig. 16, the section being taken substantially along the line 17—17 in Fig. 16.

This completes the reforming of the body and brings it into true and desired can body shape, as designated by the numeral 211 (see Figs. 9 and 17). The reformed can body is then ready to be removed from its mandrel.

It will be understood that the placing of the flattened body 28 and the passing of it through its partially opened shape 184 and over the right-hand mandrel 105, leaves the shuttle slide 151 in the position illustrated in Fig. 17, this being the forward position of the stroke. It is with the shuttle in this forward position that the next succeeding can body 28 is brought into the position A, it being on the left of the plates 154 of the shuttle slide. At that time the spreading fingers 111 associated with the right-hand mandrel 105 are in closed position, (see also Fig. 16) but the spreading fingers, connected with the mandrel 105 on the left, are in open position ready to engage the small rounded corners of the second flattened can body in its position A.

The slide 151 is now returned or moved toward the left and the flattened can body 28 is engaged by one of the plates 154 of the shuttle and is moved from its position A over the open spreading fingers 111 and on to the left-hand mandrel 105. The flattened can body during such transfer moves along the groove 91 on one side and along a second groove 161 formed in the frames 25 and 24 on its opposite side.

During this shuttle movement a plate 215, located on the right-hand end of the shuttle slide 151, engages the reformed can body 211 which is extending upwardly into a shuttle pocket 150 and moves it off its mandrel, bringing it again into the position A. A plate 216 secured to the opposite end of the slide 151 is utilized in a similar manner when the shuttle again moves forward and slides its reformed can body from the left-hand mandrel.

The reformed body 211 is less in diameter than the width of the flattened can body and is sufficiently small to pass between the inner faces of the block 92 adjacent the groove 91 and the inner faces of the blocks 97. The reformed body, when returned to position A, is thus unsupported and falls by gravity through an opening 217 cut through the table 23 at this place. The body falls into a discharge chute formed by spaced circular guide rails 218 and 219 secured to the bed 21. These rails support the reformed body which rolls out of the machine in time to clear a flattened can body 28 being moved into position for the reforming operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for reforming flattened can bodies, the combination of a magazine for holding the flattened bodies in stack formation, feeding devices for individually removing a body from said magazine, a mandrel located adjacent said magazine, means for forcing said body on said mandrel, and opposed reforming die members for engaging said body while on said mandrel and squeezing it thereagainst thereby reforming it into the can body shape finally desired.

2. In a machine for reforming flattened can bodies, the combination of a magazine for holding the flattened bodies in stack formation, feeding devices for individually removing a body from said magazine, a mandrel located adjacent said magazine, means for forcing said body on said mandrel, a spreading device secured to said mandrel for initially opening said body as it is positioned on said mandrel, and opposed reforming die members for engaging said body while on said mandrel and squeezing it thereagainst thereby reforming it into the can body shape finally desired.

3. In a machine for reforming flattened can bodies, the combination of a magazine for holding the flattened bodies in stack formation, a pair of stationary mandrels arranged on opposite sides of said magazine, feeding devices for consecutively removing said bodies from said magazine, means for forcing said bodies alternately on said mandrels, and means for reforming said bodies into the can body shape finally desired while on said mandrels.

4. In a machine for reforming flattened can bodies, the combination of a magazine for holding the flattened bodies in stack formation, feeding devices for individually removing a body from said magazine, a mandrel located adjacent said magazine, spreading devices pivoted on one end of said mandrel, means for forcing said body over said spreading devices and on said mandrel, and means for reforming said body into the can body shape finally desired while on said mandrel.

5. In a machine for reforming flattened can bodies, the combination of a magazine for holding the flattened bodies in stack formation, feeding devices for individually removing a body from said magazine, a mandrel located adjacent said magazine, a slide for forcing said body on said mandrel, means for reforming said body into the can body shape finally desired while on said mandrel, and devices secured to said slide for withdrawing said reformed body from its mandrel.

6. A machine for reforming flattened can bodies comprising in combination, a reforming mandrel, a pair of spreading fingers pivoted on one end of said mandrel, feeding devices for positioning a flattened body in alignment with said mandrel and with the opposed circular edges of the flattened body in alignment with the extremities of said spreading fingers when in extended position, means for forcing said body over said fingers and on said mandrel while initially opening the same, means for collapsing said fingers as said body is passed thereover, and means for clamping the said circular edges of the partially opened body against the walls of said mandrel whereby the said body is reformed into the can body shape finally desired.

7. In a machine for reforming flattened can bodies, the combination of a pair of stationary mandrels arranged on opposite sides of a feeding station, means for transferring bodies from said station alternately onto said mandrels and means for reforming said bodies into the can body shape finally desired while on said mandrels.

8. In a machine for reforming flattened can bodies, the combination of a forming mandrel, spreading devices carried by said mandrel, means for forcing said body over said spreading devices and onto said mandrel, actuating means for spreading said spreading devices, and a safety clutch device for forming a severable connection between said actuating means and said spreading devices.

9. In a machine for reforming flattened can bodies, the combination of a mandrel over which an individual flattened can body is positioned, opposed reforming die members for engaging said body while on said mandrel and squeezing it thereagainst, and moulds cooperating with said die members during said squeezing operation for smoothing the can body wall as the body is reformed into the can body shape finally desired.

10. In a machine for reforming flattened can bodies, the combination of a mandrel over which an individual flattened can body is positioned said mandrel, opposed reforming die members for engaging said body while on said mandrel and squeezing it thereagainst, and moulds cooperating with said die members during said squeezing operation for smoothing the can body wall as the body is reformed into the can body shape finally desired.

11. In a machine for reforming flattened can bodies, the combination of a station, a pair of mandrels arranged on opposite sides of said station, means for successively feeding flattened can bodies into said station, a shuttle device for moving a can body from said station and forcing it over one of said mandrels while said device is moved in one direction and for moving the next succeeding can body from said station and onto the opposite mandrel during movement of the shuttle in the opposite direction, and means associated with said shuttle for discharging a reformed body from one of the mandrels during the forcing of a flattened can body onto the opposite mandrel.

12. In a machine for reforming flattened can bodies, the combination of a plurality of stationary forming mandrels, means for positioning can bodies to be formed in axial alignment with said mandrels, means for arranging said bodies alternately upon said mandrels, and means for forming said bodies while upon said mandrels.

13. In a machine for reforming can bodies formed with flat sides connected by sharply curved parts, the combination of feeding means for the can bodies, and a mandrel onto which the can bodies are fed by said feeding means, said mandrel having a flat can receiving end, the greater transverse dimension of which is substantially greater than the same transverse dimension of the body portion of the mandrel said flat can receiving end guiding said sharply curved parts into predetermined location on said mandrel.

14. In a machine for reforming flat can bodies, the combination of means for feeding the flat bodies endwise, and a mandrel onto which the flat bodies are fed by said feeding means, said mandrel having a flat sharp end adapted to enter the flat body as the body is fed to the mandrel, and reciprocating dies for engaging the portions of can bodies initially connecting the flat sides of said bodies to press them against the body of the mandrel to bring said portions to desired curvature.

15. In a machine for reforming flattened can bodies having substantially flat sides connected by sharply curved parts, the combination of a forming mandrel, means for arranging said flattened body upon said mandrel and reciprocating means on opposite sides of said mandrel for engaging said sharply curved connecting parts to press them against said mandrel to shape said parts to the desired curvature and bow said flat sides to final shape.

16. In a machine for reforming flattened can bodies having substantially flat sides connected by curved parts, the combination of a forming mandrel, means for sliding and placing a said flattened body upon said mandrel, and reciprocating means on opposite sides of said mandrel for engaging said curved parts of the body to bump them against said mandrel.

17. In a machine for reforming flattened can bodies having substantially flat sides connected by curved parts, the combination of a magazine for holding the flattened can bodies in stack formation, a forming mandrel, means for individually removing said bodies successively from said magazine and placing them endwise onto said mandrel, opposed reforming die members for engaging the curved parts of said flattened can bodies and squeezing them against said mandrel, thereby bringing said bodies to desired shape, and means for actuating said die members.

18. In a machine for reforming flattened can bodies, the combination of a magazine for holding the flattened bodies in stack formation, a mandrel located adjacent said magazine, means for individually removing a can body from said magazine to said mandrel, a spreading device secured to said mandrel for initially opening said body as it is positioned on said mandrel, and opposed reforming die members for engaging said body while on said mandrel and squeezing it thereagainst thereby reforming it into the can body shape finally desired.

19. In a machine for reforming flattened can bodies, the combination of a magazine for holding the flattened bodies in stack formation, a mandrel including spreading members located adjacent said magazine, means for transferring successive bodies from said magazine onto said mandrel, said spreading members being adapted to initially open said bodies while they are being positioned upon said mandrel, and opposed bumping dies for bringing said partially reformed bodies to final desired shape.

ARTHUR C. PATTERSON.